United States Patent [19]

Kuramoto et al.

[11] 4,159,170

[45] Jun. 26, 1979

[54] CAMERA POSITION INDICATOR DEVICE

[75] Inventors: Yoshio Kuramoto, Toyonaka; Isamu Uchida, Kawachinagano; Maki Yamashita, Sakai, all of Japan

[73] Assignee: Minolta Camera Kabushiki Kaisha, Azuchimachi, Japan

[21] Appl. No.: 846,652

[22] Filed: Oct. 28, 1977

[30] Foreign Application Priority Data

Nov. 24, 1976 [JP] Japan ............................... 51-141499
Feb. 12, 1977 [JP] Japan ................................. 52-14474

[51] Int. Cl.² .......................... G03B 7/00; G03B 17/00
[52] U.S. Cl. ................................ 354/295; 354/23 R; 354/237
[58] Field of Search ................. 354/32, 35, 60 L, 126, 354/139, 149, 165, 202, 237, 295, 289

[56] References Cited

U.S. PATENT DOCUMENTS 3,485,152  12/1969  Fuwa ..................................... 354/32

FOREIGN PATENT DOCUMENTS 29831  3/1974  Japan.

*Primary Examiner*—Michael L. Gellner
*Attorney, Agent, or Firm*—Wolder, Gross & Yavner

[57] ABSTRACT

A camera includes a forwardly facing illuminatable visual member and a first group of laterally spaced parallel vertical light absorbent vanes extending from the face of the visual member to restrict the light rays directed therefrom to a predetermined horizontal angle which is a function of the intervane spacing and the depth of the vanes. The vane parameters are such that the predetermined angle is equal to the camera field angle or the range finder viewing angle or two groups of vanes may be provided corresponding to each of the camera and view finder field angles. A second group of vertically spaced horizontal vanes may be provided to limit the visibility of the visual member to one or more vertical angles. The first and second vane groups are perpendicular to each other and either intercept each other, from rectangular frames or are superimposed. A network is provided for varying the illumination of the visual member in response to the ambient light and another network is provided for illuminating the visual member in relation to the initiation of a self-timing cycle. Where two angles delineating vane groups are provided, the visual member is divided into corresponding differently illuminated sections.

16 Claims, 19 Drawing Figures

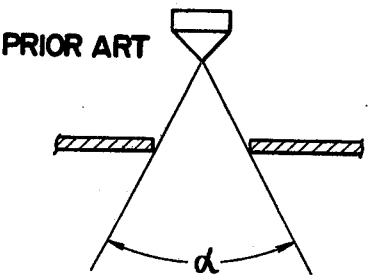
FIG.1 PRIOR ART
FIG.2
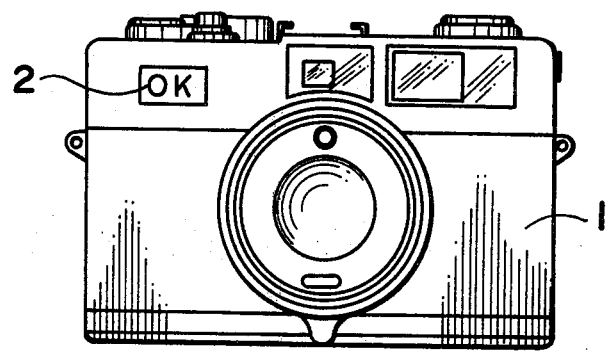
FIG.3
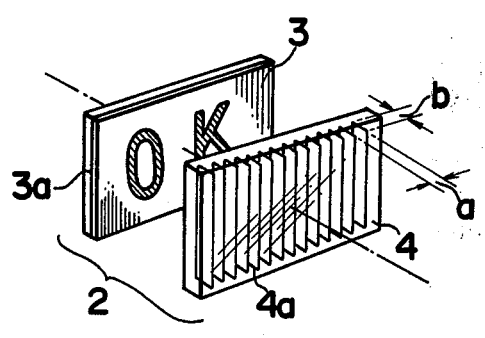
FIG.4
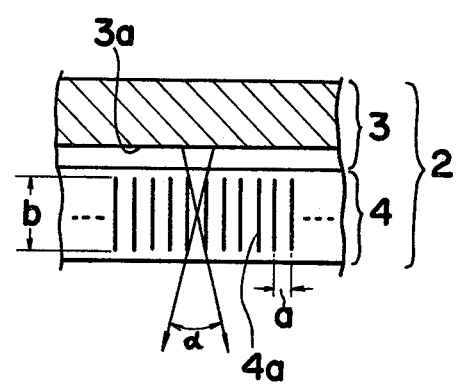

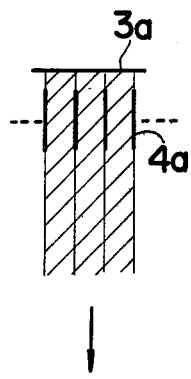 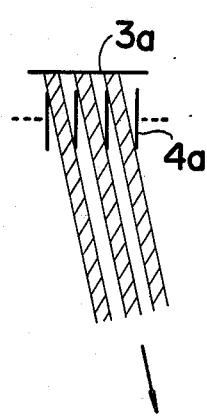 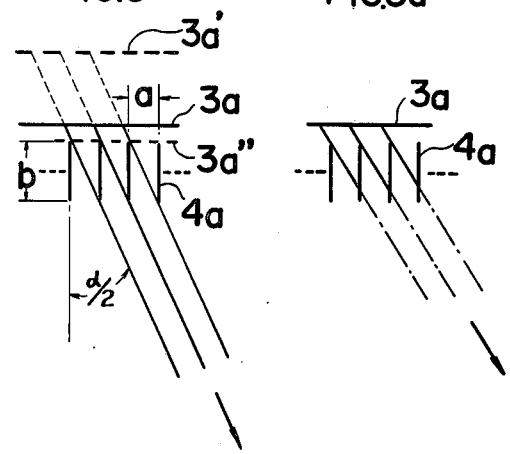
FIG.5a  FIG.5b  FIG.5c  FIG.5d
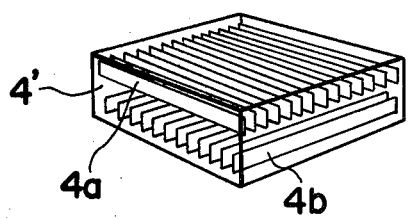
FIG.6
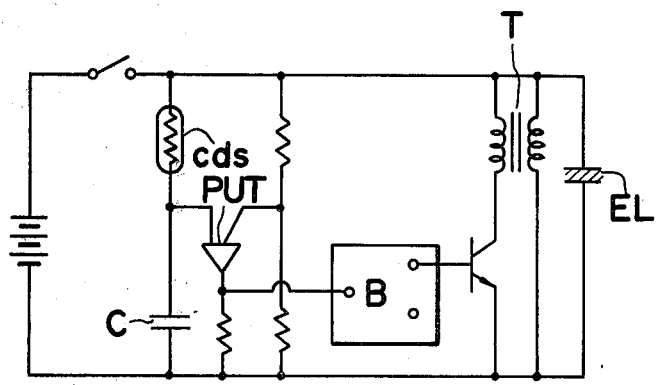
FIG.7 tion by sheets 4a. Angle $\alpha$, is determined by the spacing

CAMERA POSITION INDICATOR DEVICE

BACKGROUND OF THE INVENTION

1. Field of the Invention

The present invention relates to an indicator on a camera for informing a person to be photographed, of the location of the person relative to the field of view of the camera upon self-timer photography.

In normal photography, the photographer can easily determine the location of an object in the camera field through the view finder of the camera. However, it is not possible to ensure the location of an object in the camera field with self-timer photography since the photographer himself is in the camera field as an object. If the photographer, upon self-timer photography, improperly locates himself, he fails to be well photographed. Therefore, it is necessary for the photographer upon self-timer photography to be informed whether or not he has suitably located himself in the camera field of view.

2. Description of the Prior Art

In Japanese Patent Application Laid Open No. 49-29831 there is described an indicator of a camera for informing a person to be photographed whether or not he is within the field angle of the camera. The indicator is provided at the front of the camera to be observed by the person to be photographed.

FIG. 1 of the drawings herein is a cross-sectional view of the known indicator, which comprises a point light source and an apertured mask. The width of the aperture and the distance between the mask and the point light source define an angle $\alpha$ within which a person to be photographed can observe the point light source without interference by the mask. He, who observes the point light source, is informed that he is within the field angle of the camera since the angle $\alpha$ is set to be equal to the field angle.

However, it is important to provide a definite distance between the point light source and the apertured mask to produce the angle $\alpha$ in such an indicator. This results in the indicator requiring considerable space behind the apertured mask. Further, the pattern of the indication to be observed is limited to a form of a point.

SUMMARY OF THE INVENTION

An object of the present invention is to provide a compact indicator on a camera for informing a person to be photographed of the location of the person relative to the camera field of view.

Another object of the present invention is to provide such an indicator which requires little space behind the front face of the indicator and is capable of providing the desired information to the person by means of an indicating surface of relatively wide area.

According to the present invention, the indicator comprises a visual means and a masking means having at least a group of light absorbing narrow sheets, vanes or panels regularly arranged in parallel with each other. The masking means is positioned in front of the visual means. The field angle of the camera or the distance measuring angle upon automatic focusing is provided by the structure of the masking means by itself. The distance between the visual means and the masking means is freely selected and not necessarily determinative.

BRIEF DESCRIPTION OF THE DRAWINGS

FIG. 1 is a cross sectional view of a prior art device;

FIG. 2 is a front view of a camera to which a first embodiment of the present invention is applied;

FIG. 3 is an exploded perspective view of the first embodiment;

FIG. 4 is a partial horizontal cross sectional view of the first embodiment;

FIGS. 5a, 5b, 5c and 5d are schematical views explaining the functioning of the first embodiment;

FIG. 6 is a perspective view of a modification of an element of the first embodiment;

FIG. 7 is a circuit diagram of a network associated with the first embodiment;

DESCRIPTION OF THE PREFERRED EMBODIMENTS

Figure 8:
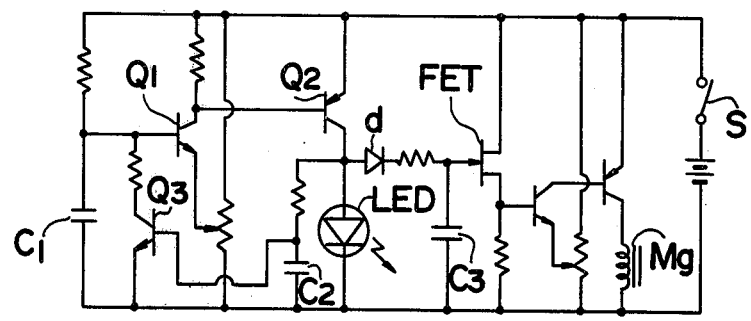
FIG. 8 is a circuit diagram of another network associated with the first embodiment.

Referring now to the drawings, particularly FIGS. 2 to 5 thereof which illustrate a preferred embodiment of the present invention, the camera functions to inform a person to be photographed of whether or not he is located within a range of field angle, the reference numeral 1 generally designates the camera body, on a desired portion of which is provided indicator 2 having characters "OK" or other suitable indicia. The construction of indicator 2 is shown in FIG. 3 in an exploded view and consists of a visual member 3 serving as an indication source for the characters "OK," and a masking member 4. Masking member 4 is located in front of visual member 3 in close proximity or contact therewith. Visual member 3 includes an electroluminescent device or light emitting diode and has a light emitting indication surface 3a having the pattern "OK" thereon. Masking member 4 is formed of a transparent acrylic resin, in which are embedded a group of narrow panels, vanes or sheets 4a. The plurality of sheets 4a are arranged in parallel with each other at a predetermined transverse spacing from one another, and have optical light absorbing surfaces. FIG. 4 is a cross sectional view of indicator 2 showing the condition of masking member 4 maintained in close contact with visual member 3. With this relationship, light emitting indication surface 3a can be seen by an observer or a person to be photographed only within a range of an angle $\alpha$, while the light emitting indication surface out of the range of this angle cannot be seen by a person to be photographed due to the interference with the full light ray interception by sheets 4a. Angle $\alpha$, is determined by the spacing a between adjoining sheets 4a and the depth or width b of each sheet 4a.

The principle of operation of the indicator described above will now be explained in conjunction with FIG. 5. If a person to be photographed stands in front of a camera along the medial axis thereof, almost all the light from the light-emitting indication surface 3a will reach his eyes, as shown by the hatched lines in FIG. 5A. Since the transverse dimension or width of the indicator 2 is extremely small, as compared to the distance from the camera to a person to be photographed, all of the rays from the light emitting indication surface towards the eyes of a person to be photographed may be safely deemed as being oriented parallel to one another. Assuming that a person to be photographed stands at a point offset slightly rightwards from the medial point as in FIG. 5a, the reduced rays at an angle to the mask optical axis as shown by hatched lines in FIG. 5b would reach his eyes. If one takes a position further shifted rightwards from the position of FIG. 5b and observes the camera from an angle as shown in FIG. 5c, then this angle is the limit at which he can see the light emitting indication surface 3a. The angle of his deviation from the optical axis of the camera at that position is $\alpha/2$. If a person to be photographed stands at a point shown in FIG. 5d further shifts rightwards from the position of FIG. 5c, all the rays coming from the light-emitting indication surface 3a toward him are intercepted by sheets 4a, and hence he can no longer see the light emitting indication surface 3a. The angle $\alpha/2$ in FIG. 5c is determined only by the ratio of a to b. Therefore, if the light emitting indication surface be positioned at 3a' or 3a'' shown by broken lines, for example, the same result will be obtained. According to the arrangements of the present invention, if a is reduced, then reduction in b becomes possible, thus providing masking member 4 in the form of an extremely thin sheet. Any spacing between the light emitting indication surface and the masking member is optional as discussed in relation to FIG. 5c, so that visual member 3 and masking member 4 may be maintained in close contact with each other, resulting in a reduction in the thickness of indicator 2 itself. The structure shown in FIG. 2 is readily accomplished by bonding the indicator 2 in the thin sheet form to the front wall of the camera, thus requiring little or no extra space for indicator 2. If a person to be photographed assumes a position shifted leftwards beyond an angle of $\alpha/2$ with respect to the camera optical axis, he can no longer see the light emitting indication surface 3a as in the case of FIG. 5. It will be understood from the above that the entire light emitting indication surface 3a can be seen within the range of angle $\alpha$. If the camera is constructed so that the angle $\alpha$ equals the camera field angle, and as long as a person to be photographed can see the light emitting indication surface 3a, he is assured that he is positioned within the range of field angle of the camera and thus within the frame of the picture film.

The structure of FIGS. 3 and 4 inform a person to be photographed of his position in the camera field angle in the transverse or horizontal direction only. If the masking member is arranged in the manner shown as at 4' in FIG. 6, information of his position in the camera field angle in the vertical direction may also be provided to a person to be photographed. Masking member 4' in FIG. 6 includes a first group of narrow sheets 4a and a second group of narrow sheets 4b with one group of sheets making a right angle with the other. The equivalent results to those of masking member 4' in FIG. 6 will be provided by arranging two masking members as shown in FIG. 3 in superimposed relation to each other in a manner that the sheets 4a of one member are at a right angle with the sheets 4a of the other member.

The indication pattern on light emitting indication surface 3a of visual member 3 is not limitative to the characters "OK", but may be any desired sign, or otherwise, a uniformly luminous surface may be employed.

Since the indicator 2 on the camera body is seen in the external light by a person to be photographed, it is desirable that, in order for him to know at a glance whether or not he is positioned within the field angle of the camera, the intensity of indication light being emitted should be increased with an increase in the brightness of the external light. FIG. 7 is a block diagram of an electric circuit for that purpose. Shown at CdS is a photoconductive element for receiving thereon the camera incident or external light, through which is charged a capacitor C. When capacitor C is charged to a voltage of a given level, a programmable unijunction transistor PUT becomes conducting, thus causing capacitor C to discharge. Thus, the combination of capacitor C, PUT and CdS produces an oscillation whose period is shortened in proportion to the brightness of the external light. As a result of PUT becoming conducting, a bistable multivibrator B is energized to produce an output of a rectangular wave form, thereby causing emission of light from an electroluminescent device EL corresponding to visual member 3 in FIG. 3. A brighter external light shortens the period of the rectangular waveform output, increasing the frequency of alternating current for exciting electro-luminescent device EL, whereby the intensity of light being emitted is increased, thus providing a brighter indication.

FIG. 8 shows another embodiment of an electric circuit for energizing indicator 2, wherein the light emitted by indicator 2 as well serves to indicate the lapse of time of a self-timer. If a self-timer is set, then a switch S closes. When switch S closes, a capacitor C1 starts charging, and after the lapse of a given period of time, a transistor Q1 becomes conducting and hence a transistor Q2 also becomes conducting, whereby a light emitting diode LED corresponding to visual member 3 of FIG. 3 starts emitting light, so that indicator 2 is seen as being luminous. When transistor Q2 becomes conducting, capacitor C3 starts charging through a diode d, and a capacitor C2 as well starts charging. When the voltage at capacitor C2 is raised to a given level, transistor Q3 becomes conducting, whereby capacitor C1 starts discharging, thereby interrupting transistor Q2. The charge at C2 is allowed to discharge through LED while the charge at C3 does not discharge in the presence of diode d. Thus, transistor Q3 becomes non-conducting, and capacitor C1 again starts charging. The cycle of the above operation is repeated to intermittently light LED. At every cycle of this operation, electricity is accumulated little by little in capacitor C3. When the voltage across capacitor C3 reaches a given level, the current is allowed to flow to FET, and eventually to magnet M, whereby the camera shutter is released. Stated otherwise, indicator 2 intermittently lights for a given period of time prior to the time interval termination of the self-timer to inform that the shutter is released after a given number of lightings. Within the duration of the intermittent lighting of the indication surface, a person to be photographed can determine his desired position.

Figure 9:
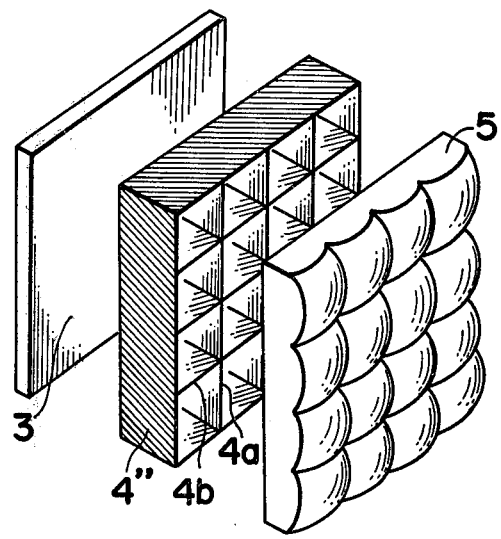
FIG. 9 is an exploded perspective view of a second embodiment of the present invention.

FIG. 9 shows a further embodiment of an indicator, in which a lenticulae 5 is disposed in front of masking member 4". Masking member 4" in this embodiment consists of vertical sheets 4a and horizontal sheets 4b which are arranged to intersect one another. The provision of lenticulae 5 permits the conversion of the characteristic angle α of masking member 4" to a different angle. If any change in the range of object field is caused by exchange of an objective lens, lenticulae 5 also may be exchanged for another type, so that an accurate range of field angle is provided even for an exchangeable lens. It will be understood that lenticulae 5 may be used for compensating for a variation in the angle of the masking member, or for the case where an indicator is constituted by utilizing a masking member having an angle α different from the camera field angle. Where it is desired to use a lenticulae without exchange, the luminous indication surface of the visual member should preferably be positioned at a focal point of the lenticulae.

Figure 10:
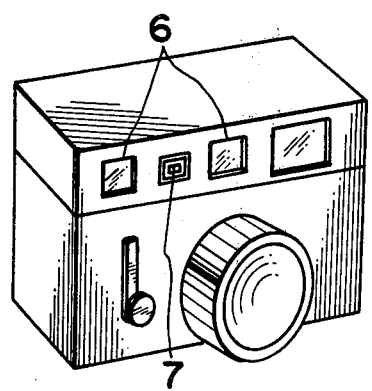
FIG. 10 is a perspective view of a camera to which a third embodiment is applied.
Figure 11:
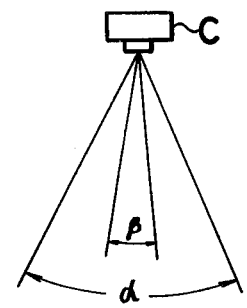
FIG. 11 is a schematical view showing the functioning of the camera as related to the third embodiment.

FIG. 10 shows a still further embodiment of the present invention, wherein the indicator is provided for a camera with an automatic focusing device. The automatic focusing device is so designed as to automatically measure an object distance from the camera to a main object within an object field and to automatically focus the main objecting lens according to the object distance thus measured. The range of object distance measurement is limited only to part of a center of the object field in which the main object is to be positioned. This indicates that unless the main object to be positioned within the aforesaid range of object distance measurement, failure of accurate automatic focusing results. Since, in the usual photographing, the aforesaid range is indicated within the finder, such failure is avoided. In the case of the self-timer photographing, however, the failure of accurate automatic focusing is likely to occur. In this embodiment, a person to be photographed can recognize the range of the objective field as well as the range of distance measurement. In FIG. 10, shown at 6 are two range-finder windows for automatic distance measurement. Between these windows is provided an indicator 7. FIG. 11 shows the relationship among a camera C, a field angle α and an object distance measuring angle β. Indicator 7 of FIG. 10 is so arranged as to indicate the field angle α as well as the object distance measuring angle β.

Figure 12:
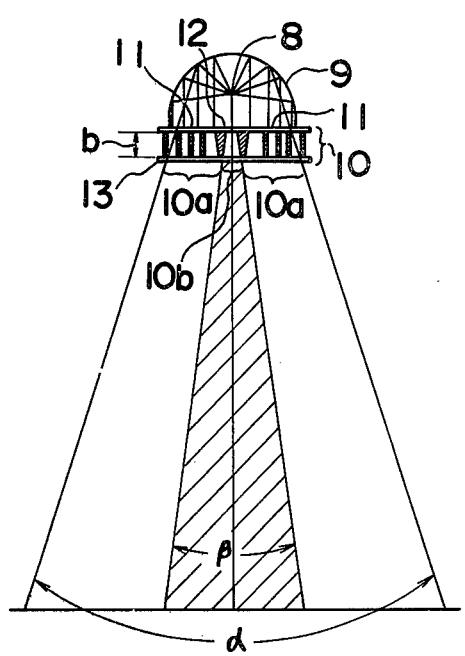
FIG. 12 is a cross sectional view of the third embodiment.
Figure 13:
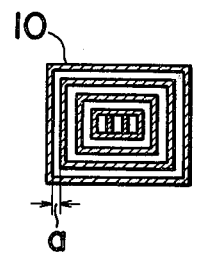
FIG. 13 is a front view of the third embodiment.

FIG. 12 is a cross sectional view showing the construction in detail of indicator 7. Designated by 8 is a light emitting element such as a lamp or a light emitting diode. Shown at 9 is a curved rear reflector member, the inner peripheral surface of which is formed as a light diffusing reflector. Designated 10 is a masking member disposed in front of the light emitting element 8, the masking member being formed of an assembly of multiple square frame elements as shown in FIG. 13. The ratio of the space a between the neighboring square frame elements to the depth b is determined to give the angle α. In the portions 10a other than the central portion 10b of masking member 10, direct light from light emitting element 8 is intercepted by masking member 10, and the light once diffused by reflecting shade 10 alone is introduced frontwards of the camera. The range of angle α, in which the diffused light is seen, is determined by a/b, which angle is set to be equal to the range of field angle of the camera. In the central portion 10b of masking member 10, direct light from the light emitting element 8 is directed forwardly from the camera. This direct light diverges within the limit of a given angular range which is determined by an inner periphery of the central, smallest square frame element and a depth thereof and it is therefore limited to the range of angle β that this light can be seen by a person standing in front of a camera. This range of angle is adjusted so as to be equal to the range of distance measurement β shown in FIG. 11. For ease of one's discrimination of the light representing the range of angle α from the light representing the range of angle β, a filter of one color 11 covering the areas 10a and a filter of different color 12 covering the central area 10b are provided in the rear portion of masking member 10 respectively. Shown at 13 is a front dust-guard glass panel overlying the front of the masking member.

Light emitting element 8 is lit when the self-timer is set and is extinguished when the shutter is released. If a person standing in front of the camera and watching the indicator 7 can see the light from the light emitting element, he is assured of his standing at a point within the range of the camera field angle, and according to the color of the light, he can know whether or not he is located within the range of the distance measuring angle. Also, if the light remains lit, he knows that the self-timer is in operation.

Reflecting shade 9 in FIG. 12 is used only for the purpose of increasing the utilization of light from the light source 8, but is not required on the basis that the range of angle α be indicated by the light reflected from the reflecting shade 9 and the range of angle β be indicated by the direct light from light source 8.

Figure 14:
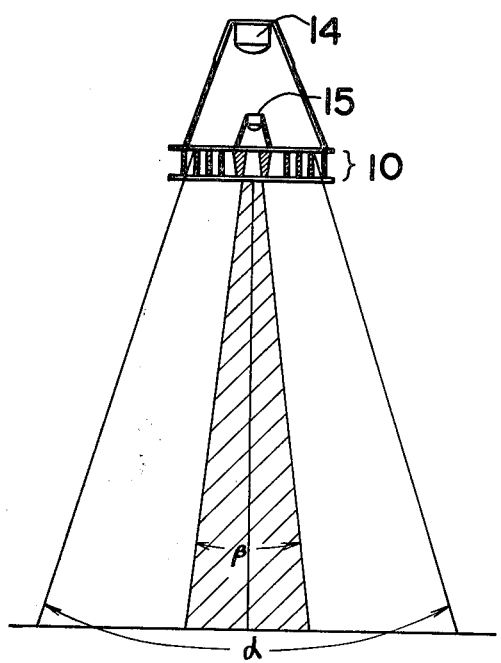
FIG. 14 is a horizontal cross sectional view of a fourth embodiment of the present invention.

FIG. 14 shows a still further embodiment, in which instead of reflecting shade 9, two light sources 14, 15 are incorporated: one light source 15 being provided for indication of the angular range of object distance measurement, and the other light source 14 being for indication of the range of camera field angle. These light sources are quite the same in function as the light source in FIG. 12. In this instance, these light sources 14 and 15 are constructed to emit light of individually different colors so that neither filter 11 nor 12 as in the structure of FIG. 12 is needed.

Figure 15:
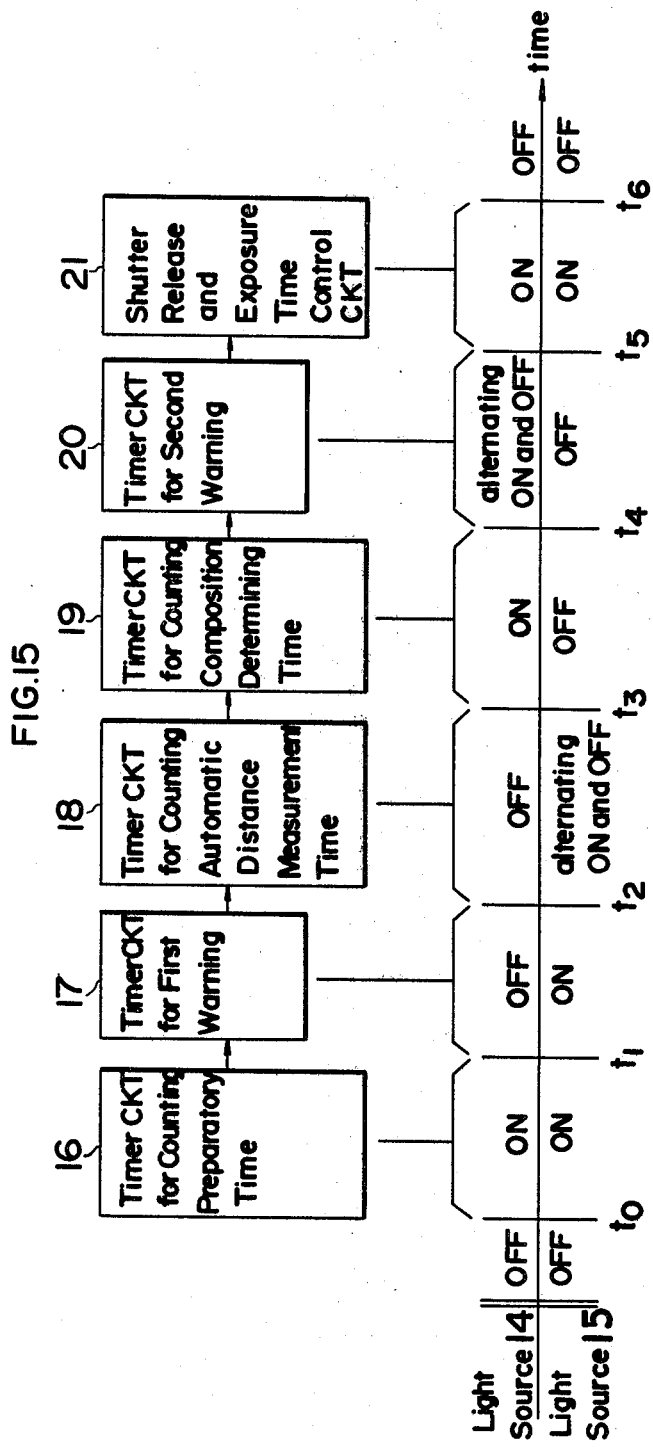
FIG. 15 is a block diagram of a control circuit associated with the fourth embodiment and a time chart showing the operation of the control circuit.

The use of two separate light sources 14 and 15 as in FIG. 14 permits the provision of various signs, through the mutual flashing thereof, to a person to be photographed, besides the indication of a range of camera field angle and a range of object distance measuring angle. FIG. 15 is a block diagram of a control circuit for providing a flashing operation to these light sources and an example of the time sequence thereof. If a self-timer and an automatic focusing device are set, and the self-timer starts to function at a stage $t_0$, then a timer 16 starts, to thereby maintain two light sources 14, 15 on for a duration from $t_0$ to $t_1$. The duration from $t_0$ to $t_1$ given by timer 16 is preset to be slightly longer than necessary for an operator to move to a desired position after having set the camera, so that within this period of time, the operator can assume the desired position and as assured by the visibility of the lights from light sources 14 and 15. After the lapse of the aforesaid period of time and at a succeeding stage $t_1$, one light source 14, for indication of a range of camera field angle, is extinguished and in turn a timer 17 starts, to thereby maintain the other light source 15 alone lit for a duration from $t_1$ to $t_2$, so that one can know that an object distance measurement and focusing adjustment are prepared to be initiated. At $t_2$, the object distance measurement and focus adjustment starts, and at the same time, a timer 18 starts. For a duration of $t_2$ to $t_3$, the light source 15, for the indication of the range of object distance measurement, repeats alternating on and off, so as to indicate that the object distance is under measurement and the focus is under adjustment. The period of time from $t_2$ to $t_3$ is preset to be long enough to achieve the automatic distance measurement and focus adjustment. At a stage $t_3$, light source 15 is turned off, and in turn light source 14 is turned on, thereby indicating the termination of the automatic focusing. At this stage, a timer 19 also starts. Within the period of time from $t_3$ to $t_4$ given by timer 19, the operator can freely move to select his position in the composition of the picture being photographed, within the range of the camera field angle but without changing the distance of the operator to the camera and can assume the desired or selected position. For this duration, light source 14 remains lit, so that the operator can move within the range in which one can see the light from this light source. At $t_4$, light source 14 alternates on and off only for a duration from $t_4$ to $t_5$, thereby giving a warning that the camera shutter will soon be released. When, at $t_5$, the shutter is released, light sources 14 and 15 are both turned on, and when the exposure terminates at $t_6$, both light sources 14, 15 are turned off, thus informing the operator of the termination of the picture-taking operation.

Figure 16:
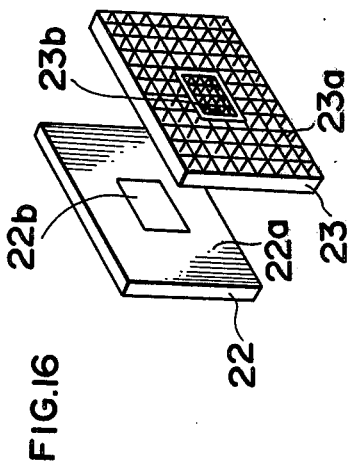
FIG. 16 is an exploded perspective view of a fifth embodiment of the present invention.

FIG. 16 shows a still further embodiment of an indicator capable of indicating a field angle $\alpha$ and a distance measurement angle $\beta$. Shown at 22 is a visual member, and at 23 a masking member which is aligned with and in close contact with the visual member. Visual member 22 and masking member 23 in this embodiment are basically the same in construction as those of FIG. 3. Visual member 22 has a luminous indication surface 22a of a desired color. Masking member 23 has a mask portion 23a consisting of vertical sheets and horizontal sheets which intersect one another, the aforesaid mask portion covering the area of luminous indication surface 22a of visual member 22 when assembled. Thus, the combination of 22a and 23a indicates the angle $\alpha$.

Visual member 22 has another luminous indication surface 22b different in color from luminous indication surface 22a thereof. Masking member 23 has another mask portion 23b corresponding to the luminous indication surface 22b, the mask portion 23b consisting of vertical sheets and horizontal sheets which mutually intersect. The ratio of the width b of each sheet of mask portion 23b to the space between the neighboring sheets (the definitions of a and b corresponding to those given in connection with FIG. 3) differs from that in mask portion 23a. Thus, the combination of 22b and 23b the distance measurement angle $\beta$.

While there have been described and illustrated preferred embodiment of the present invention, it is apparent that numerous alterations, omissions and additions may be made without departing from the spirit thereof.

We claim:

1. An indicator of a camera for informing a person to be photographed of the location of the person relative to the camera comprising:
    a visual means defining the source of an indication located on the camera and facing the object field thereof;
    a masking means coupled with said visual means including a first group of transversely spaced, parallel light absorbing narrow sheets for limiting the passage of light from said visual means toward the object field to light rays which are not intercepted by said narrow sheets; and
    lenticulae positioned in front of the masking means.

2. An indicator of a camera for informing a person to be photographed of the location of the person relative to the camera comprising:
    a visual means defining the source of an indication located on the camera and facing the object field thereof and including a sheet having an indicating plane; and
    a masking means coupled with said visual means including a transparent sheet overlying said visual means sheet and a first group of transversely spaced, parallel light absorbing narrow sheets imbedded on said transparent sheet for limiting the passage of light from said visual means toward the object field to light rays which are not intercepted by said narrow sheets.

3. An indicator of a camera for informing a person to be photographed of the location of the person relative to the camera comprising:
    a visual means defining the source of an indication located on the camera and facing the object field thereof; and
    a masking means coupled with said visual means including a first group of transversely spaced, parallel light absorbing narrow sheets for limiting the passage of light from said visual means toward the object field to light rays which are not intercepted by said narrow sheets, the ratio of the width of the individual light absorbing narrow sheets to the distance between the light absorbing narrow sheets being in accordance with the field angle of the camera, whereby the indicator is capable of informing the person whether or not the person is within the camera field angle.

4. The indicator of claim 3, wherein said masking means further includes a second group of transversely spaced, parallel light absorbing narrow sheets which are at right angles to those of said first group.

5. The indicator of claim 4, wherein the narrow sheets of said second group are combined with the narrow sheets of said first group to form a plurality of coaxial rectangular frames.

6. The indicator of claim 4, wherein the narrow sheets of said second group intersect with those in said first group.

7. The indicator of claim 3 further comprising means for directing light toward the object field within the distance measuring angle, whereby the indicator is further capable of informing the person whether or not the person is within the distance measuring angle.

8. The indicator of claim 7, wherein said visual means has a first light source and said directing means has a second light source.

9. The indicator of claim 8 further comprising means for controlling said first and second light sources.

10. An indicator of a camera for informing a person to be photographed of the location of the person relative to the camera comprising:
    a visual means defining the source of an indication located on the camera and facing the object field thereof; and
    a masking means coupled with said visual means including a first group of transversely spaced, parallel light absorbing narrow sheets for limiting the passage of light from said visual means toward the object field to light rays which are not intercepted by said narrow sheets, the ratio of the width of the individual light absorbing narrow sheets to the distance between the light absorbing narrow sheets being determined to define the distance measuring angle of the camera, whereby the indicator informs the person whether or not the person is within the distance measuring angle.

11. An indicator of a camera for informing a person to be photographed of the location of the person relative to the camera comprising:
a visual means defining the source of an indication located on the camera and facing the object field thereof;
means for electrically controlling the brightness of said visual means in response to the brightness of the camera incident light; and
a masking means coupled with said visual means including a first group of transversely spaced, parallel light absorbing narrow sheets for limiting the passage of light from said visual means toward the object field to light rays which are not intercepted by said narrow sheets.

12. An indicator of a camera for informing a person to be photographed of the location of the person relative to the camera comprising:
a visual means defining the source of an indication located on the camera and facing the object field thereof;
means for rendering said visual means effective only during self timer photography; and
a masking means coupled with said visual means including a first group of transversely spaced, parallel light absorbing narrow sheets for limiting the passage of light from said visual means toward the object field to light rays which are not intercepted by said narrow sheets.

13. A camera provided with a device for indicating to an observer in front of the camera his position relative to the optical axis of the camera, said device compromising a forwardly facing illuminatable visual member located on said camera and a plurality of laterally spaced vertical first light absorbing vanes, projecting forwardly from proximate the front face of said visual member to restrict the visibility of said visual member for said observer to a predetermined horizontal angle which is a function of the depth of said vanes and the spacing between successive vanes.

14. The camera of claim 13 having a predetermined horizontal field angle wherein said vane restricting horizontal angle is substantially equal to said horizontal field angle.

15. The camera of claim 13 including a transparent lenticular sheet disposed forwardly of said vanes to modify said vane restricted horizontal angle.

16. The camera of claim 13 including a plurality of vertically spaced horizontal second light absorbing vanes registering with and at right angles to said first vanes.

* * * * *